UNITED STATES PATENT OFFICE.

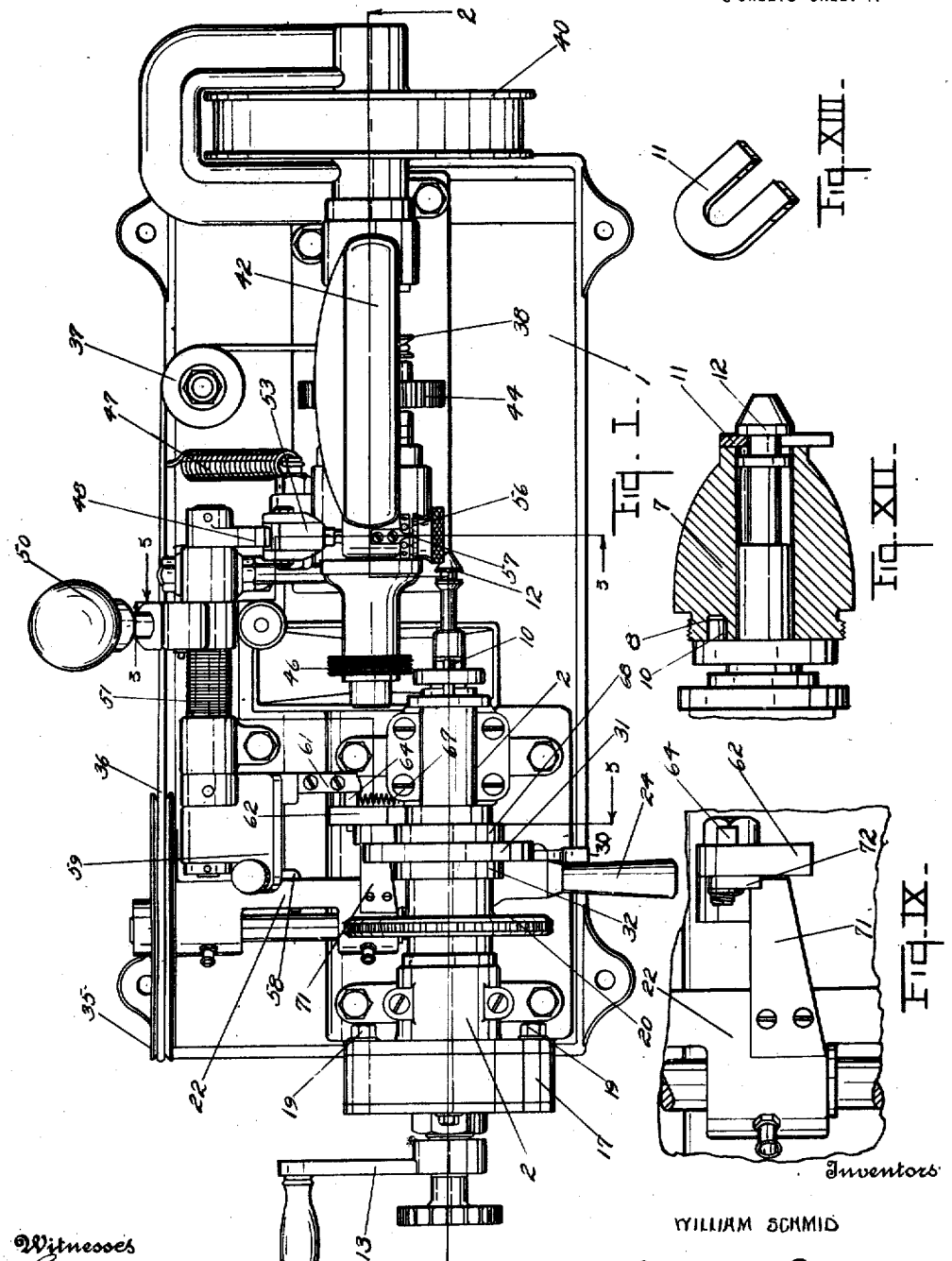

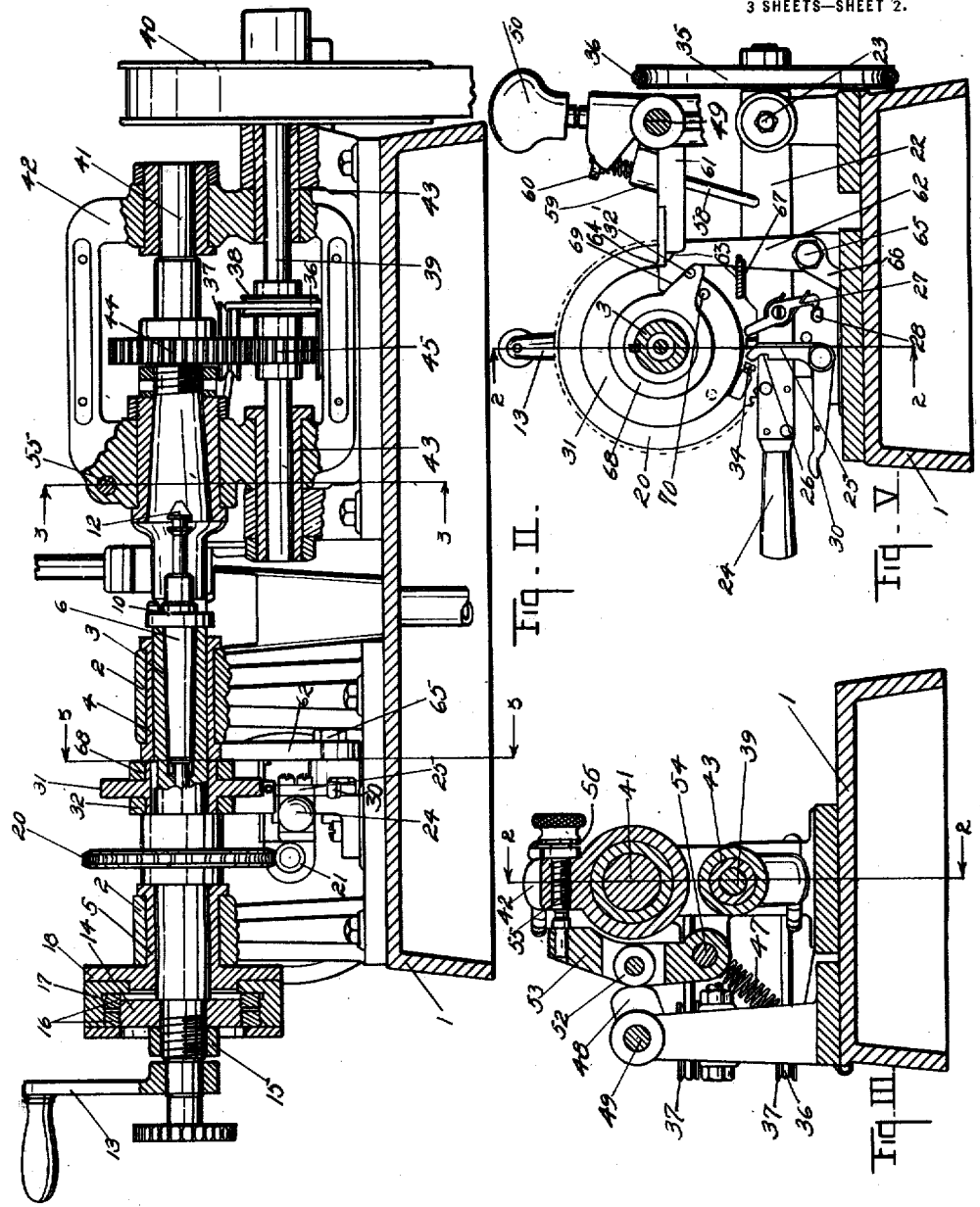

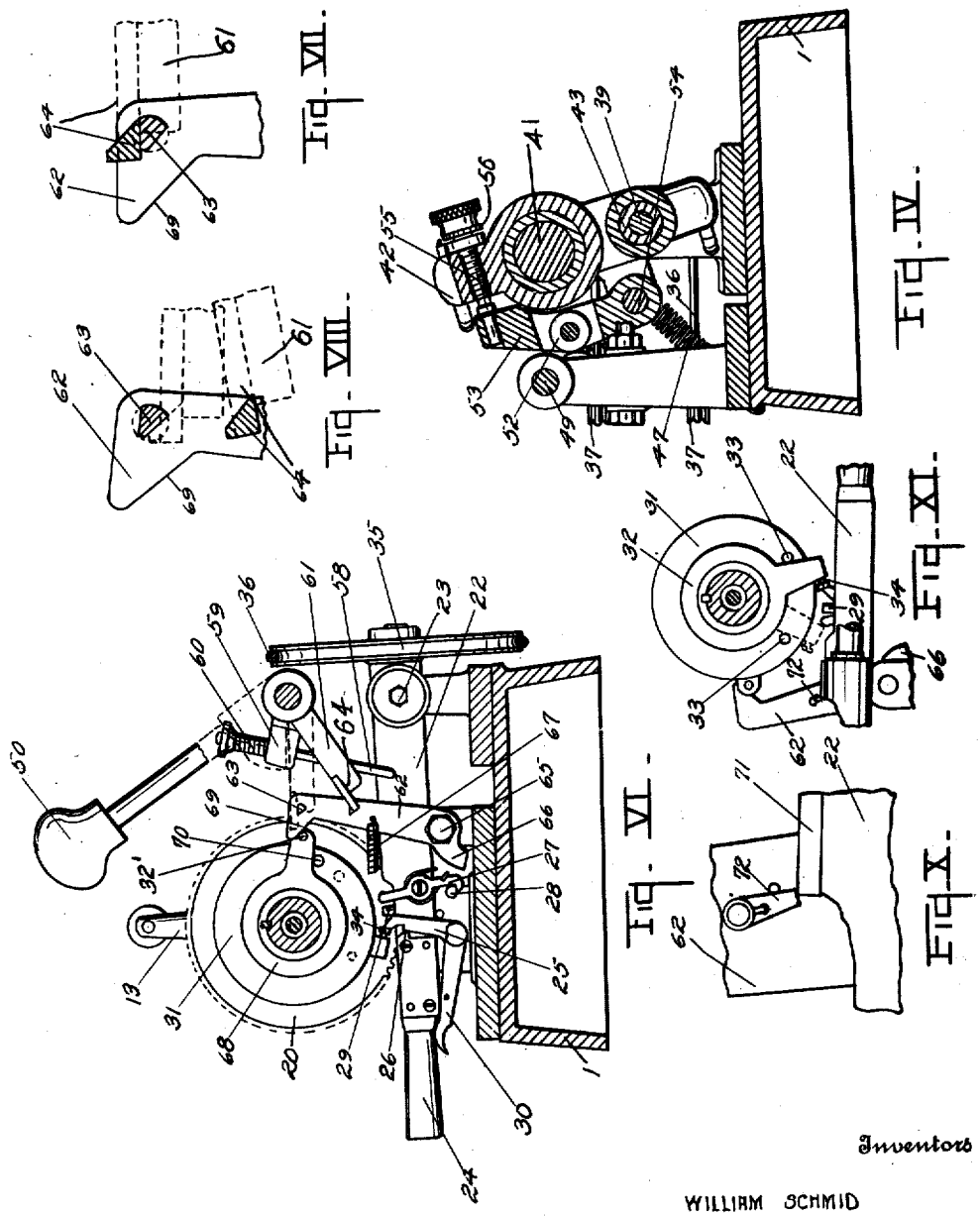

WILLIAM SCHMID, OF KALAMAZOO, MICHIGAN.

MILLING MACHINE.

1,427,761.  Specification of Letters Patent.  Patented Aug. 29, 1922.

Application filed April 10, 1919. Serial No. 288,919.

*To all whom it may concern:*

Be it known that I, WILLIAM SCHMID, a citizen of the United States, residing at the city and county of Kalamazoo, State of Michigan, have invented certain new and useful Improvements in Milling Machines of which the following is a specification.

This invention relates to improvements in milling machines.

In the accompanying drawing I have illustrated my improvements in a hobbing thread cutting or milling machine as that is the type of machine in which I have heretofore embodied my invention in practice. Various features, however, are capable of and desirable for embodiment in other types of milling machines or cutters.

The main objects of this invention are:

First, to provide an improved milling machine of the thread hobbing type which is capable of performing its work very rapidly and perfectly.

Second, to provide an improved milling machine which is capable of very rapid manipulation and this by an unskilled operator.

Third, to provide an improved thread milling machine which may be readily adjusted or adapted for cutting threads of different pitch.

Further objects and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a plan view of a machine embodying the features of my invention.

Fig. II is a detail view partially in vertical longitudinal section on a line corresponding to lines 2—2 of Figs. I, III and V.

Fig. III is a transverse section on a line corresponding to line 3—3 of Figs. I and II with the cutter spindle frame in its actuated or working position.

Fig. IV is a detail transverse section corresponding to Fig. III with the cutter spindle frame in its retracted or inoperative position.

Fig. V is a transverse section on a line corresponding to line 5—5 of Figs. I and II with the parts in driving or working position, showing details of the control mechanism.

Fig. VI is a transverse section corresponding to that of Fig. V with the parts in retracted or inoperative position.

Figs. VII and VIII are enlarged detail views partially in section showing the cutter spindle frame control dog and trip arm in engaged and disengaged positions.

Fig. IX is an enlarged detail plan view showing means for preventing the engaging of the work spindle gears until the adjustment of the cutter spindle frame is completed.

Fig. X is a detail view of the parts shown in Fig. IX looking from the left thereof.

Fig. XI is a detail transverse section showing further details of the work spindle driving control member.

Fig. XII is a detail of the work chuck, the work being shown in longitudinal section.

Fig. XIII is a perspective view of the work retaining key.

In the drawing similar reference characters refer to similar parts throughout the several views, and the sectional views are taken looking in the direction of the little arrows at the ends of the section lines.

Referring to the drawing, the base 1 is preferably a casting adapted to be mounted on a bench or table. At one end of this base are bearing pedestals 2. 2 for the work spindle 3 which is mounted for axial movement, the pedestals, in the structure illustrated, being provided with bushings 4 and 5.

At its inner end the spindle is provided with a work holder or chuck 6 adapted to receive the work 7 which, in the structure illustrated, is a shell fuse. The work is slipped upon the chuck and provided with a bore 8 engaging a pin 10 on the chuck, the work being retained by the yoke-like key 11 slipped behind the head 12. The details, however, of this holder or chuck form no part of my present invention.

At its outer end the spindle 3 is provided with a return crank 13 and with a master feed means comprising the feed nut 14 clamped upon the spindle by means of the nut 15 and the coacting threaded feed members 16 mounted within the cylindrical holder 17 detachably secured to the plate 18. These feed members are removable so that the feed of the spindle can be varied as desired. The feed members 16 are threaded into the holder which is detachably secured to the plate by the bolts 19, see Fig. 1.

The driven worm gear 20 is splined to the spindle. A driving worm 21 is carried by the supporting frame 22 pivoted at 23 at the rear of the base to project forwardly below the work spindle and provided with a handle 24 at its front end. This driving worm support 22 is held in its worm engaging position by the dog 25 which engages a keeper 26 on the support,—see Figs. V and VI. A catch 27 is provided for holding the support 22 in its disengaged or inoperative position, the catch 27 coacting with a pin 28,—see Fig. VI. A fixed return stop 29 is provided on the frame 22.

The dog 25 is preferably provided with a finger piece 30 so that the dog may be manually released when desired. To automatically release the dog we mount a control disk 31 upon the spindle, the disk being splined to the spindle. At the side of this control disk is a rotatably mounted control member 32. This control member 32 has a limited rotatable movement relative to the control disk, this movement being limited by the pins 33,—see Fig. XI. When the spindle reaches the limit of its forward feed movement or stroke the adjustable tappet 34 on the control member 32 engages and releases the dog 25 allowing the driving worm support 22 to drop and disengaging the worm.

When the spindle is returned to its initial position by means of the crank 13 the control member 32 disengages the catch 27 and striking the stop 29 determines the initial position of the spindle. By this arrangement of parts more than one complete revolution of the spindle is provided insuring a clean complete cut of the hobbing cutter. Other forms of lost motion connection for the control member of the spindle permitting this complete movement might be provided. The worm 21 is provided with a driving pulley 35 connected by the belt 36 passing around the guide pulleys 37 to a pulley 38 on the driving shaft 39 which has a power pulley 40.

The cutter spindle 41 is mounted in a rocking frame 42 supported on the bushings 43 of the driving shaft so that the spindle driving pinions 44 and 45 are always retained in mesh.

The cutter 46, shown conventionally in Fig. I, is of the hobbing cutter type. The cutter spindle frame is urged to its inoperative position by means of the coiled spring 47 and is forced to its operative position by means of the cam 48 on the rock shaft 49, the rock shaft having a handpiece 50 projecting upwardly in convenient position for manipulation. This rock shaft is urged to its releasing position by means of the coiled spring 51.

To regulate the position of the cutter relative to the work the roller 52 with which the cam 48 coacts is mounted on a support 53 pivoted at 54 at its lower end and adjustably supported at its upper end by means of the screw 55. This provides for a very accurate adjusting means for regulating the throw of the spindle frame or gauging the position of the cutter relative to the work. The screw 55 is provided with scale or gauging indicia 56, while the frame is provided with a pointer 57 enabling very accurate adjustment.

The support 22 for the driving worm 21 is connected to the rock shaft 49 by means of the rod or link 58 disposed through the arm 59 on the rock shaft, the link being provided with a spring 60 for lifting the driving worm when it is released. The rock shaft is controlled from the work spindle, the rock shaft being provided with a trip arm 61 coacting with the pivoted dog 62. See Figs. V, VI, VII and VIII. The arm 61 is provided with a lug-like part 64 which is adapted to rest upon the lug 63 on the dog 62 supporting the rock shaft in its initial position. These engaging parts are shown in enlarged form in Figs. VII and VIII. The dog 62, which may be designated as the cutter spindle control dog to distinguish from the work spindle control dog, is pivoted at 65 and is provided with a toe 66 which engages the base limiting the forward movement of the dog, it being urged forwardly by means of the spring 67.

A trip member 68 for the cutter spindle control dog is rotatably mounted on the work spindle at the side of the control disk 31 and provided with a pin 32' which coacts with the cam face 69 of the dog 62. A pin 70 on the control disk actuates the trip member 68, but does not interfere with the return of the control disk to its initial position. With the parts thus arranged, the rock shaft 49 is released through the rotation of the work spindle and control members thereon, so that the release is properly timed.

To prevent the actuation of the driving worm support to engaging position before the full or complete adjustment of the cutter we provide the support 22 with an arm 71 coacting with a catch 72 on the cutter control dog 62, the operation of the mechanism thus being controlled so that it is impossible to engage the driving means for the work spindle until the spindle is returned to its initial or return position and also the other parts properly positioned. In operating the device, the operator places the work to be threaded or milled on a work holder of a suitable design to suit the work, as shown in Fig. XII. The operator then moves the lever 50 rearwardly, that is, rearwardly relative to the front of the machine, which advances the cutter by means of the cam 48 and brings the tripping lever 61 to its position to be engaged by the dog 63 on the lever 62. This same movement puts the spring 60 under tension through the arm 59, so that it is ready to act when the dog 72 releases the worm support 22, which engages the work spindle feed through the worm 21 and worm gear 20. The movement of the dog 72 is accomplished by the movement of the lever 62, which is actuated through the arm 61, the arm being operatively associated with the lever 50 and the arm and lever 62 having coacting cam members 63 and 64. On the engagement of the feed worm and gear the cutting begins and, when completed, the feed is disengaged by tripping the dog 25 through the arm 34 on the control disk 31. The movement of this disk is controlled by pins 33. The cutter spindle is brought to its neutral position at the same time by the member 68 actuated through the pin 70, the arm 68 engaging the cam face on the lever 62, tripping the arm 61 and allowing the spring 60 to move the parts back to neutral position.

I have illustrated and described my improvements as I have embodied them in a thread hobbing machine. Various features are readily adaptable and desirable for use in machines for other work. The machine is of large capacity and may be successfully operated by unskilled workmen without liability to injury either to the machine or to the work.

I have not attempted to illustrate or describe various modifications in structural details which I have made and contemplate or various adaptations which are possible as I believe the disclosure made will enable those skilled in the art to which my invention relates to embody or adapt the same as may be desired.

Having thus described my invention, what I claim as new and desire to secure by Letters Patent, is:

1. In a structure of the class described, the combination of a frame, a work spindle mounted thereon for axial movement, a master feed screw for said spindle, a return crank for said spindle, a return stop on said frame, a driven worm gear splined to said spindle, a driving worm, a support for said driving worm adjustable to engage and disengage said worms, a dog for holding said support in its work engaging position, a catch for holding said support in worm disengaging position, a control disk splined upon said spindle, a control member rotatably mounted at the side of said control disk, said disk having a pair of spaced pins thereon limiting the movement of said control member relative to said disk, said control member being adapted to release said dog at the end of the forward movement of the spindle disengaging said worms and on the return of the spindle to disengage said support retaining latch and coact with said return stop on said frame, a cutter adjustable to and from working position, means for actuating said cutter to working position, a return spring for said cutter, a cutter control dog for holding it in working position, a trip member for said cutter control dog rotatably mounted at the side of said control disk, said control disk being provided with an actuating pin for said trip member, and a catch on said cutter control dog for said driving worm support.

2. In a structure of the class described, the combination of a frame, a work spindle mounted thereon for axial movement, a master screw for said spindle, a driven worm gear splined to said spindle, a driving worm, a support for said driving worm adjustable to engage and disengage said worm, a dog for holding said support in its work engaging position, a control disk splined upon said spindle, a control member rotatably mounted at the side of said control disk, said disk having a pair of spaced pins thereon limiting the movement of said control member relative to said disk, said control member being adapted to release said dog at the end of the forward movement of the spindle, a cutter adjustable to and from working position, means for actuating said cutter to working position, a return spring for said cutter, a cutter control dog for holding it in working position, a trip member for said cutter control dog rotatably mounted at the side of said control disk said control disk being provided with an actuating pin for said trip member, and a catch on said cutter control dog for said driving worm support.

3. In a structure of the class described, the combination of a frame, a work spindle mounted thereon for axial movement, a master feed screw for said spindle, a return crank for said spindle, a return stop on said frame, a driven worm gear splined to said spindle, a driving worm, a support for said driving worm adjustable to engage and disengage said worm, a dog for holding said support in its work engaging position, a catch for holding said support in worm disengaging position, a control disk splined upon said spindle, a control member rotatably mounted at the side of said control disk, said disk having a pair of spaced pins thereon limiting the movement of said control member relative to said disk, said control member being adapted to release said dog at the end of the forward movement of the spindle disengaging said worms and on the return of the spindle to disengage said support retaining latch and coact with said return stop on said frame, a cutter adjustable to and from working position, means for actuating said cutter to working position, a return spring for said cutter, a cutter control dog for holding it in working position, and a trip member for said cutter control dog rotatably mounted at the side of said control disk, said control disk being provided with an actuating pin for said trip member.

4. In a structure of the class described, the combination of a frame, a work spindle mounted thereon for axial movement, a master feed screw for said spindle, a driven worm gear splined to said spindle, a driving worm, a support for said driving worm adjustable to engage and disengage said worm, a dog for holding said support in its work engaging position, a control disk splined upon said spindle, a control member rotatably mounted at the side of said control disk, said disk having a pair of spaced pins thereon limiting the movement of said control member relative to said disk, said control member being adapted to release said dog at the end of the forward movement of the spindle, a cutter adjustable to and from working position, means for actuating said cutter to working position, a return spring for said cutter, a cutter control dog for holding it in working position, and a trip member for said cutter control dog rotatably mounted at the side of said control disk, said control disk being provided with an actuating pin for said trip member.

5. In a structure of the class described, a work spindle mounted thereon for axial movement, a master feed screw for said spindle, a return crank for said spindle, a return stop, a driven worm gear splined to said spindle, a driving worm, a support for said driving worm adjustable to engage and disengage said worms, a dog for holding said support in worm engaging position, a catch for holding said support in worm disengaging position, a control disk splined upon said spindle, and a control member rotatably mounted at the side of said control disk and adapted to release said dog at the end of the forward movement of the spindle disengaging said worms and on the return of the spindle to disengage said support retaining latch and coact with said return stop on said frame, said disk having spaced pins thereon limiting the movement of said control member relative to said disk.

6. In a structure of the class described, a work spindle mounted thereon for axial movement, a master feed screw for said spindle, a driven worm gear splined to said spindle, a driving worm, a support for said driving worm adjustable to engage and disengage said worm, a dog for holding said support in worm engaging position, a control disk splined upon said spindle, and a control member rotatably mounted at the side of said control disk and adapted to release said dog at the end of the forward movement of the spindle, said disk having spaced pins thereon limiting the movement of said control member relative to said disk.

7. In a structure of the class described, a work spindle mounted thereon for axial movement, a master feed screw for said spindle, a return crank for said spindle, a return stop on said frame, a driven gear splined to said spindle, a driving worm, a support for said driving worm adjustable to engage and disengage said worm, a dog for holding said support in engaging position, a catch for holding said support in disengaging position, and a control member having a lost motion connection to said spindle adapted to release said dog at the end of the forward movement of the spindle and on the return of the spindle to disengage said support retaining latch and coact with said return stop on said frame.

8. In a structure of the class described, a work spindle mounted thereon for axial movement, a master feed screw for said spindle, a driven gear splined to said spindle, a driving worm, a support for said driving worm adjustable to engage and disengage said worm, a dog for holding said support in engaging position, and a control member having a lost motion connection to said spindle adapted to release said dog at the end of the forward movement of the spindle.

9. In a structure of the class described, the combination of a work spindle, a return stop for said spindle, a driven gear, a driving gear adjustable to engage and disengage the said driven gear, a dog for holding said driving gear in engagement with said driven gear, a catch for holding said driving gear in its retracted position, a control member rotatably mounted on said spindle and having a lost motion connection therewith and adapted to release the driving gear dog, and on the return of the spindle to disengage said driving gear retaining latch and engage said return stop, an adjustable cutter, a cutter control dog for holding said cutter in operative position, and a trip member for said cutter control dog rotatably mounted on said spindle and having lost motion connection therewith adapted to release said cutter dog.

10. In a structure of the class described, the combination of a work spindle, a driven gear, a driving gear adjustable to engage and disengage the said driven gear, a dog for holding said driving gear in engagement with said driven gear, a control member rotatably mounted on said spindle and having a lost motion connection therewith and adapted to release the driving gear dog, an adjustable cutter, a cutter control dog for holding said cutter in operative position, and a trip member for said cutter control dog rotatably mounted on said spindle and having lost motion connection therewith adapted to release said cutter dog.

11. In a structure of the class described, the combination of a work spindle, a return stop for said spindle, a driven gear, a driving gear adjustable to engage and disengage the said driven gear, a dog for holding said driving gear in engagement with said driven gear, a latch for holding said driving gear in its retracted position, and a control member having a lost motion connection with said spindle and adapted to release the driving gear dog, and on the return of the spindle to disengage said driving gear retaining latch and engage said return stop.

12. In a structure of the class described, the combination of a work spindle, a driven gear, a driving gear adjustable to engage and disengage the said driven gear, a dog for holding said driving gear in engagement with said driven gear, and a control member having a lost motion connection with said spindle and adapted to release the driving gear dog.

13. In a structure of the class described, the combination of a work spindle mounted for axial movement, a master feed member for said spindle, disengageable driving connections for said spindle, a control member having a lost motion connection with said spindle and adapted to disengage said spindle driving means at the end of the forward movement of the spindle, an adjustable cutter, means for holding said cutter in operative position, a trip member for said cutter holding means having lost motion connection with said spindle and adapted to release said cutter holding means when the work spindle reaches the end of its forward stroke.

14. In a structure of the class described, the combination of a work spindle, disengageable driving connections for said spindle, an adjustable cutter, means for adjusting said cutter to operative position, means for holding said cutter in operative position, a trip member for said cutter holding means having lost motion connection with said spindle and adapted to release said cutter holding means, and operating connections for said cutter adjusting means to said work spindle driving means whereby the driving means is actuated to engaging position.

15. In a structure of the class described, the combination of a work spindle, disengageable driving connections for said spindle, an adjustable cutter, means for holding said cutter in operative position, and a trip member for said cutter holding means having lost motion connection with said spindle and adapted to release said cutter holding means.

16. In a structure of the class described, the combination of a work spindle, disengageable driving connections for said spindle, and a control member having a lost motion connection with said spindle and adapted to disengage said spindle driving means.

17. In a structure of the class described, the combination of a work spindle mounted for axial movement, a master feed member for said spindle, disengageable driving connections for said spindle, a means actuated by said spindle for disengaging the driving means at the end of the forward movement of the spindle, a cutter adjustable to and from the work, means for adjusting said cutter to operative position, means for holding said cutter in operative position, means for releasing said cutter actuated by said spindle and adapted to release said cutter holding means when the work spindle reaches the end of its forward stroke, and operating connections for said cutter adjusting means to said work spindle driving means whereby the driving means is actuated to engaging position.

18. In a structure of the class described, the combination of a work spindle, disengageable driving connections for said spindle, means actuated by said spindle for disengaging the driving means, a cutter adjustable to and from the work, means for adjusting said cutter to operative position, means for holding said cutter in operative position, means for releasing said cutter actuated by said spindle and adapted to release said cutter holding means, and operating connections for said cutter adjusting means to said work spindle driving means whereby the driving means is actuated to engaging position.

19. In a structure of the class described, the combination of a work spindle, disengageable driving connections for said spindle, means actuated by said spindle for disengaging the driving means, a cutter adjustable to and from the work, means for adjusting said cutter to operative position, and means for releasing said cutter actuated by said spindle and adapted to release said cutter holding means.

20. In a structure of the class described, the combination of a work spindle, a spindle return stop, a driven gear on said spindle, a driving gear, a support for said driving gear adjustable to engage and disengage said gear, a dog for holding said support in its gear engaging position, a catch for holding said support in gear disengaging position, a control disk rotatable with said spindle, a control member rotatably mounted at the side of said control disk and adapted to release said dog at the end of the forward movement of the spindle disengaging said gears and on the return of the spindle to disengage said support retaining latch and coact with said return stop, said disk having spaced pins thereon limiting the movement of said control member relative to said disk, a cutter, an adjustable cutter supporting frame, a rock shaft provided with a cam for actuating said cutter frame, a spring for returning said cutter frame to inoperative position, an arm on said rock shaft, a link disposed through said arm connected to said driving gear support, a spring on said link for actuating said support, a trip arm on said rock shaft, a cutter control dog coacting with said arm to hold said rock shaft in actuated position, a trip member for said cutter control dog rotatably mounted at the side of said control disk, said control disk being provided with an actuating pin for said trip member, and a catch on said cutter control dog coacting with said driving gear support preventing the actuation thereof until the cutter is actuated.

21. In a structure of the class described, the combination of a work spindle, a spindle return stop, a driven gear on said spindle, a driving gear, a support for said driving gear adjustable to engage and disengage said gear, a dog for holding said support in its gear engaging position, a control disk rotatable with said spindle, a control member rotatably mounted at the side of said control disk and adapted to release said dog at the end of the forward movement of the spindle disengaging said gears, said disk having spaced pins thereon limiting the movement of said control member relative to said disk, a cutter, an adjustable cutter supporting frame, a rock shaft provided with a cam for actuating said cutter frame, a spring for returning said cutter frame to inoperative position, a trip arm on said rock shaft, a cutter control dog coacting with said arm to hold said rock shaft in actuated position, and a trip member for said cutter control dog rotatably mounted at the side of said control disk, said control disk being provided with an actuating pin for said trip member.

22. In a structure of the class described, the combination of a work spindle, a disengageable driving means for said work spindle, a control member having lost motion connection with said work spindle adapted to disengage said driving means at the end of the forward movement of the spindle, a cutter, an adjustable supporting frame therefor whereby the cutter may be adjusted to and from working position, a rock shaft provided with a cam for actuating said cutter supporting frame, a spring for returning said frame to inoperative position, operating connections for said rock shaft to said driving means comprising a spring, a trip arm on said rock shaft, a cutter control dog coacting with said arm to hold said rock shaft in actuated position, a trip member for said cutter control dog having a lost motion connection with said work spindle, and a catch on said cutter control dog preventing the actuation of said driving means until the cutter frame is actuated.

23. In a structure of the class described, the combination of a work spindle, a disengageable driving means for said work spindle, a control member having lost motion connection with said work spindle adapted to disengage said driving means at the end of the forward movement of the spindle, a cutter, an adjustable supporting frame therefor whereby the cutter may be adjusted to and from working position, a rock shaft provided with a cam for actuating said cutter supporting frame, a spring for returning said frame to inoperative position, operating connections for said rock shaft to said driving means comprising a spring, a trip arm on said rock shaft, a cutter control dog coacting with said arm to hold said rock shaft in actuated position, and a trip member for said cutter control dog having a lost motion connection with said work spindle.

24. In a structure of the class described, the combination of a work spindle, a cutter, an adjustable supporting frame therefor whereby the cutter may be adjusted to and from working position, a rock shaft provided with a cam for actuating said cutter frame, a roller with which said cam coacts adjustably mounted on said frame, an adjusting means for said roller, a spring for returning said frame to inoperative position, a trip arm on said rock shaft, a cutter control dog coacting with said arm to hold said rock shaft in actuated position, a control disk rotatable with said work spindle, and a trip member for said cutter control dog rotatably mounted at the side of said control disk, said control disk being provided with an actuating pin for said trip member.

25. In a structure of the class described, the combination of a work spindle, a cutter, an adjustable supporting frame therefor whereby the cutter may be adjusted to and from working position, a rock shaft provided with a cam for actuating said cutter frame, a spring for returning said frame to inoperative position, a trip arm on said rock shaft, a cutter control dog coacting with said arm to hold said rock shaft in actuated position, a control disk rotatable with said work spindle, and a trip member for said cutter control dog rotatably mounted at the side of said control disk, said control disk being provided with an actuating pin for said trip member.

26. In a structure of the class described, the combination of a work spindle, a cutter, an adjustable supporting frame therefor whereby the cutter may be adjusted to and from working position, a rock shaft provided with a cam for actuating said cutter frame, a roller with which said cam coacts adjustably mounted on said frame, an adjusting means for said roller, a spring for returning said frame to inoperative position, a trip arm on said rock shaft, a cutter control dog coacting with said arm to hold said rock shaft in actuated position actuated by said work spindle.

27. In a structure of the class described, the combination of a work spindle, a cutter, an adjustable supporting frame therefor whereby the cutter may be adjusted to and from working position, a rock shaft provided with a cam for actuating said cutter frame, a spring for returning said frame to inoperative position, a trip arm on said rock shaft, and a cutter control dog coacting with said arm to hold said rock shaft in actuated position actuated by said work spindle.

28. In a structure of the class described, the combination of a work spindle, a cutter, an adjustable supporting frame therefor whereby the cutter may be adjusted to and from working position, a means for supporting said cutter in working position, a driving means for said spindle, and means for disconnecting said driving means and retracting said cutter controlled by the rotative movement of the spindle but independent of the axial movement thereof.

29. In a structure of the class described, the combination of the work spindle, a cutter adjustable to and from working position, means for driving and feeding said spindle, and means for retracting said cutter actuated by the rotative movement of the spindle but independent of the axial movement thereof.

30. In a structure of the class described, the combination of a work spindle, a cutter movable to and from said work spindle, means for driving said spindle, and means for controlling the retraction of said cutter actuated by the rotative movement of the spindle but independent of axial movement thereof.

In witness whereof I have hereunto set my hand and seal in the presence of two witnesses.

WILLIAM SCHMID. [L. S.]

Witnesses:
 LUELLA G. GREENFIELD,
 MARGARET L. GLASGOW.